United States Patent [19]
Friederichs

[11] 3,716,935
[45] Feb. 20, 1973

[54] MAGNETIC BOARD WITH CHART AND MARKERS

[75] Inventor: Haas Friederichs, Wiesbaden, Germany

[73] Assignee: Hermann Holtz, Wiesbaden, Germany

[22] Filed: Aug. 5, 1971

[21] Appl. No.: 169,416

[30] Foreign Application Priority Data

Sept. 24, 1970 Germany.....................P 20 47 075.1

[52] U.S. Cl...............40/142 A, 35/7 A, 273/136 B, 335/302
[51] Int. Cl..............................................G09f 7/02
[58] Field of Search ....40/124 A; 35/7 A; 273/136 B; 335/302

[56] References Cited

UNITED STATES PATENTS

| 3,093,919 | 6/1963 | Holtz | 40/142 A |
| 3,156,056 | 11/1964 | Pribil | 35/7 A X |
| 3,456,373 | 7/1969 | Epton | 40/142 A X |
| 3,651,592 | 3/1972 | McCormick et al. | 40/142 A |
| 3,659,353 | 5/1972 | D'Agrosa | 35/7 A X |

Primary Examiner—Robert W. Michell
Assistant Examiner—L. R. Oremland
Attorney—Allison C. Collard

[57] ABSTRACT

A magnetic board having a ferromagnetic chart and permanently magnetized markers. The board comprises a base board having a continuous strip of permanently magnetized material along the circumferential edges thereof and a filler material of non-permanent magnetic material filling the space intermediate said continuous strip.

11 Claims, 4 Drawing Figures

PATENTED FEB 20 1973 3,716,935
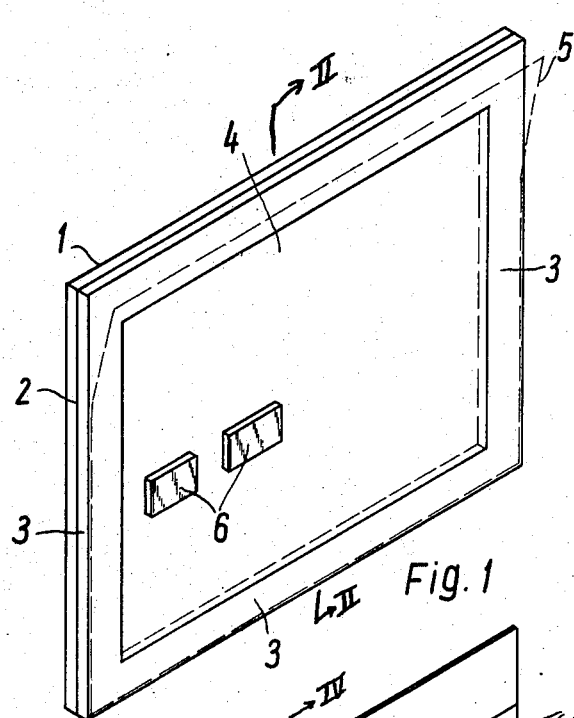
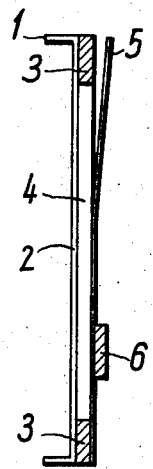
Fig. 1
Fig. 2
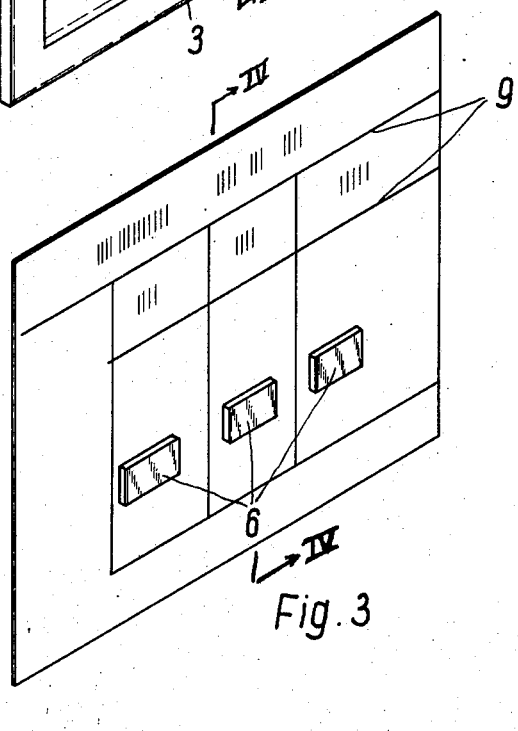
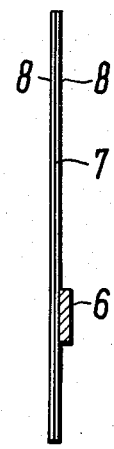
Fig. 3
Fig. 4
Inventor:
Wilhelmine Haas Friederichs
By Allmer P Pollard
Attorney

MAGNETIC BOARD WITH CHART AND MARKERS

The present invention relates to a magnetic board with a chart and markers. Magnetic boards are known in which the face of the board consists substantially of a magnetic board having a stripe-like closely arranged pole separation with an alternate north-south polarity. This known board magnet is generally made of rubber plastic resin based permanent magnetic material, for instance, material which has an exydic base.

The reverse side of the known magnetic board field is provided with a soft iron sheet material, which serves on the one hand to strengthen the structure of the board and on the other hand to form a magnetic return closing. In this way a better holding force is obtained on the front face of the magnetic board.

It is also known to mount layers of plastic material on the magnetic board having markings imprinted thereon. Such markings may be maps, screens for graphical representation, organization and review plans, etc. For demonstrating certain proceedings in connection with such charts small ferromagnetic markers, possibly having different shapes, can be placed on the board by a magnetic force.

During later development of the known magnetic board, it was desirable to mount whole charts on the board. It was also desirable to mount the various charts mentioned above in series on the magnetic board one superimposed on the other. Furthermore, markers of various colors and different shapes could be mounted on these charts and held there by magnetic force.

In order to render these charts magnetic it was necessary to make them of ferromagnetic foils. Plastic or paper material had to be mounted on at least one and sometimes both sides of the foil and the chart imprinted thereon. Since these charts were ferromagnetic in their core, they could be mounted on the magnetic board.

It was deemed desirable to mount a plurality of these charts on the magnetic board one superimposed on the other. However this proved to be disadvantageous because the first chart mounted on the magnetic board weakened the magnetic force of the board so that the markers did not remain in position. For this purpose the markers were made in form of small permanent magnets which were mounted on the charts.

However, this also proved to be disadvantageous, particularly in view of the fact that if the markers were placed on the charts before the charts were placed on the magnetic board the markers had a tendency to move away from their designated places because of the stripe-like magnetism of the magnetic board. This movement of the markers corresponds to the opposite poles of the magnetic board and the magnetic markers.

It is therefore an object of the present invention to provide a magnetic board with a chart and magnetic markers which do not have the above-mentioned disadvantages. With the present invention it is possible to place one or a plurality of ferromagnetic charts on the magnetic board without any dislodgement of the permanently magnetized markers from their designated places.

It is another object of the present invention to provide a magnetic board which conserves the quantity of magnetic material which must be used.

In order to achieve the objects of the present invention, a magnetic board is provided having a ferromagnetic chart and permanently magnetized markers. The invention is characterized in that in the range of the circumferential side edges of a right angled or square base board, a continuous rubber or plastic resin based strip of permanently magnetized material is provided with a closely arranged pole magnetism. The intermediate space between these permanent magnetic strips is filled with a non-permanent magnetic filler material which forms an even plane with the strips. A ferromagnetic foil having a one or two sided layer of paper or plastic, is mounted onto the continuous strip of permanently magnetized material and serves as the board. On this board, which is permanently magnetized, the permanently magnetized markers are magnetically placed on the desired places.

In the present invention, the magnetic board contains considerably less permanent magnetic material than the previously known magnetic boards thus making the present board less expensive to manufacture. Furthermore, the magnetic board of the present invention permits the placement of permanently magnetized markers onto the permanently magnetized markings of the ferromagnetic charts. If a plurality of charts are used with their markers being placed upon them, the charts can be mounted on the magnetic board and taken from there for safekeeping, without the markers being moved from their designated location.

In accordance with a preferred embodiment of the present invention, the magnetic board may be made of a sheet metal plate. A continuous strip of rubber or plastic resin based permanently magnetic material is mounted around the circumferential edges of the sheet metal plate. The intermediate space may be filled with a layer of non-magnetic material, for instance, a fiber, carton, or plastic layer, in order to obtain an even plane with the remainder of the material on the sheet metal plate. Such a board may be coated with a light thin film of plastic in order to give it a neat appearance.

It is also possible, in accordance with the present invention, to provide recesses in the circumferential edges of a rectangular or square plate made of wood. The rubber or plastic resin based permanent magnetic strip is then inserted into the recess. The recess is such that the permanent magnetic strip is in the same plane with the remainder of the material.

Other objects and features of the present invention will become apparant from the following detailed description taken in connection with the accompanying drawings. It is to be understood, however, that the drawings are designed for the purposes of illustration only, and not as definition of the limits and scope of the invention.

In the drawings, wherein similar reference numerals denote similar elements throughout the several views:

FIG. 1 is a perspective view of the magnetic board of the present invention with a ferromagnetic chart and permanently magnetized markers;

FIG. 2 is a cross section of the board of FIG. 1 taken along section line II—II of FIG. 1;

FIG. 3 is a perspective view of a ferromagnetic chart of the present invention with permanent magnetic markers; and FIG. 4 is a cross section through the chart of FIG. 3 taken along section line IV—IV of FIG. 3.

Referring to the drawings, the magnetic board 2 is provided with flanged edges 1, in accordance with the invention. In the area of the circumferential edges of the sheet material board 2, a continuous strip of permanently magnetic plastic strip 3 is mounted. This permanently magnetic material may be, for instance, a rubber or plastic resin base magnetic powder, whereby the plastic material may be rolled out or extruded. A non-permanent magnetic material 4 is provided in the space between the edges of sheet metal board 2 within the continuous strip of permanent magnetic material 3 as a filler material. In accordance with the invention, a ferromagnetic chart 5 is mounted onto the magnetic board, which is indicated by the phantom lines in FIG. 1. A plurality of permanently magnetized markers 6 are mounted on the ferromagnetic chart.

As seen in FIGS. 3 and 4, the ferromagnetic chart 5 consists of a soft iron foil 7 having a thin layer 8 of non-permanent magnetic material, such as a paper or plastic material, on one or both sides thereof. The paper or plastic layer 8 may have imprinted thereon predetermined screen graduates 9, or other markings such as charts or maps. The permanently magnetized markers 6 are magnetically mounted on the ferromagnetic chart 5 as desired.

The particular advantage of the magnetic board of the present invention consists substantially in the fact that the chart together with already placed markers 6, may be magnetically mounted onto the board, and removed therefrom without the permanently magnetized markers 6 being displaced from their original positions, or being removed from the chart altogether.

It should be understood that the magnetic board may be made of a non-permanent magnetic material, whereby the permanent magnetic strip along the circumferential edges of the board may be placed into a recess or groove running along the edges of the board. In this way the permanent strip is situated on the same plane with the non-permanent magnetic material.

While only several embodiments of the present invention have been shown and described, it will be obvious to those persons skilled in the art that many changes and modifications may be made thereunto without departing from the spirit and scope of the invention.

What is claimed is:

1. A magnetic board which comprises:
   a right angled base board;
   a continuous strip of permanent magnetic material having a closely arranged pole magnetism along the circumferential side edges of said right angled base board;
   a non-permanent magnetic filler material filling the space intermediate said continuous strip of permanently magnetized material, said filler material forming a continuous plane with said continuous strip of permanently magnetized material;
   a ferromagnetic chart mounted onto said permanently magnetized strip; and
   at least one permanently magnetized marker placed as desired on said ferromagnetic chart.

2. The magnetic board as defined in claim 1 wherein said ferromagnetic chart is comprised of a ferromagnetic foil and a thin layer of non-permanent magnetic material on at least one side of said ferromagnetic foil.

3. The magnetic board as defined in claim 2, wherein the material of said permanently magnetized strip is comprised of a rubber based material.

4. The magnetic board as defined in claim 2, wherein the material of said permanently magnetized strip is comprised of a plastic resin based material.

5. The magnetic board as defined in claim 2, wherein the material of said permanently magnetized strip comprises a permanent magnetic powder on an oxydized base.

6. The magnetic board as defined in claim 2, wherein the thin layer of non-permanent magnetic material on said ferromagnetic chart is paper.

7. The magnetic board as defined in claim 2, wherein the thin layer of non-permanent magnetic material on said ferromagnetic chart is plastic.

8. The magnetic board as defined in claim 2, wherein said non-permanent magnetic filler material is comprised of a fibrous material.

9. The magnetic board as defined in claim 2, wherein said non-permanent magnetic filler material is comprised of a carton material.

10. The magnetic board as defined in claim 2, wherein said non-permanent magnetic filler material is comprised of a plastic material.

11. A magnetic board which comprises:
    a right angled base board of non-permanent magnetic material;
    a continuous groove along the circumferential edge of said right angled base board;
    a continuous strip of permanent magnetic material having a closely arranged pole magnetism inserted into said circumferential continuous groove, said continuous strip of permanent magnetic material together with said base board forming an even plane,
    a ferromagnetic chart mounted onto said permanently magnetized strip; and
    at least one permanently magnetized marker placed as desired on said ferromagnetic chart.

* * * * *